(12) United States Patent
Culter

(10) Patent No.: US 7,434,201 B2
(45) Date of Patent: Oct. 7, 2008

(54) METHOD AND APPARATUS PROVIDING FOR EXTENDABLE INTERACTION BETWEEN FIRMWARE AND OPERATING SYSTEMS ON DIGITAL DEVICES

(75) Inventor: Bradley G. Culter, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 673 days.

(21) Appl. No.: 10/872,708

(22) Filed: Jun. 21, 2004

(65) Prior Publication Data
US 2005/0283755 A1 Dec. 22, 2005

(51) Int. Cl.
G06F 9/44 (2006.01)

(52) U.S. Cl. .................. 717/106; 713/1; 713/2

(58) Field of Classification Search ........... 717/106; 713/1, 2
See application file for complete search history.

(56) References Cited

U.S. PATENT DOCUMENTS

| | | | |
|---|---|---|---|
| 6,081,890 A * | 6/2000 | Datta ........................ 713/1 |
| 6,185,677 B1 * | 2/2001 | Nijhawan ................... 713/2 |
| 6,970,957 B1 * | 11/2005 | Oshins et al. .............. 710/60 |
| 6,986,032 B2 * | 1/2006 | Qureshi et al. ............. 713/1 |
| 6,990,576 B2 * | 1/2006 | Qureshi et al. ............. 713/2 |
| 7,159,105 B2 * | 1/2007 | Rothman et al. ........... 713/1 |
| 2003/0110370 A1 * | 6/2003 | Fish et al. .................. 713/2 |
| 2004/0030874 A1 * | 2/2004 | Qureshi et al. ............. 713/1 |

* cited by examiner

Primary Examiner—Wei Y. Zhen
Assistant Examiner—Matthew J Brophy

(57) ABSTRACT

A method, memory system, and program product is described for providing extended functions in a digital device conforming to an intercompartment language specification. The method involves preparing a list of unused opcodes according to a version of the language of one compartment, and publishing the list of unused opcodes to code of a second compartment. Code of the second compartment then assigns opcodes to extended functions such that the opcodes assigned are unused opcodes in the version of language of both compartments. The assigned opcodes are used in generating code in the intercompartmental language, and published as a table of assigned opcodes with associated function names to the first compartment.

13 Claims, 4 Drawing Sheets

METHOD AND APPARATUS PROVIDING FOR EXTENDABLE INTERACTION BETWEEN FIRMWARE AND OPERATING SYSTEMS ON DIGITAL DEVICES

FIELD OF THE INVENTION

The present invention relates to the field of communication between system firmware and operating systems in digital devices.

BACKGROUND

Compartmentalization of Code

Code executable on modern digital computing devices, including digital computers, is often divided into multiple compartments. Typically, these compartments include a firmware compartment, an operating system compartment, and an application code compartment.

Code in each compartment often originates from different vendors, or different groups of programmers at the same vendor, at different times. A digital device may run different operating system compartment and application code at different times, typically on the same firmware compartment code. Further, it is common that code of each compartment is updated independently of updates for other compartments.

Need for Standardization

It is desirable to standardize interfaces between compartments such that systems will function without requiring undue debug of each possible combination of firmware, operating system, and application code. With standardized interfaces, basic features of both hardware and software should function, although some advanced features may require additional drivers.

System Management

Modern digital devices, even those operable under similar operating systems, often have greatly different underlying hardware. System management and graphical display hardware is often different from system to system. System management functions may include power management and cooling control, hardware monitoring including power, fan speed and component temperature, timers, processor clock generation, battery charging and charge monitoring, disk drive power control and error monitoring, memory error correction, system partitioning among multiple operating systems, interactions between multiple processors of the system, and hot-socketing.

It is desirable to extend the intercompartment interfaces in a way compatible with future revisions of the specification. In particular, assignment of extended functions to an opcode assumed to be unused by code of one compartment does not result in unexpected operation when that opcode is assumed to be predefined by code of another compartment.

SUMMARY

A method, memory system, and program product provides extended functions in a digital device conforming to an intercompartment language specification such as AML. The method involves preparing a list of unused opcodes according to a version of the language of one compartment, and publishing the list of unused opcodes to code of a second compartment. Code of the second compartment then assigns opcodes to extended functions such that the assigned opcodes are unused opcodes in the versions of language supported by both compartments. The assigned opcodes are used in generating code in the intercompartmental language, and published as a table of assigned opcodes with associated function names to the first compartment. The compartment executing the generated code then associates the opcodes to functions according to the table of extended function names and opcodes.

DETAILED DESCRIPTION OF THE EMBODIMENTS

Many key features of system operation are dependent on the operating system, including task queuing, interrupt handling, and many I/O functions. In the past, once system boot is complete many such functions were controlled by a customized device driver installed on the operating system.

It is desirable that many system management functions be operable under control of the operating system and without need for a customized device driver.

Advanced Configuration and Power Interface (ACPI) is an open industry specification co-developed by Hewlett-Packard®, Intel®, Microsoft®, Phoenix Technologies®, and Toshiba®. The ACPI standard governs how the firmware and operating system interact to control system management functions of a digital device. As of this writing, revision 2.0c of this standard, dated August 2003, is available. ACPI Machine Language (AML), as defined in section 17 of that standard, provides a standardized machine readable language used for components of a system compliant with ACPI to perform hardware-dependent system management functions under control of an operating system.

AML provides a set of predetermined control functions for addressing system management hardware. The predetermined set of functions, and a predetermined opcode encoding of those functions, is defined in a particular version of the AML specification portion of the ACPI specification. The AML specification is an intercompartmental language specification because it specifies these predetermined functions and encodings.

AML provides standard functions for operating-system directed power management online reconfiguration of hardware. These functions are represented in interpretable AML as a binary numerical opcode, which may be combined with a sequence of operands. The binary numerical opcode is a 16-bit number, allowing for many more opcodes than are defined in the AML specification.

Figure 1:
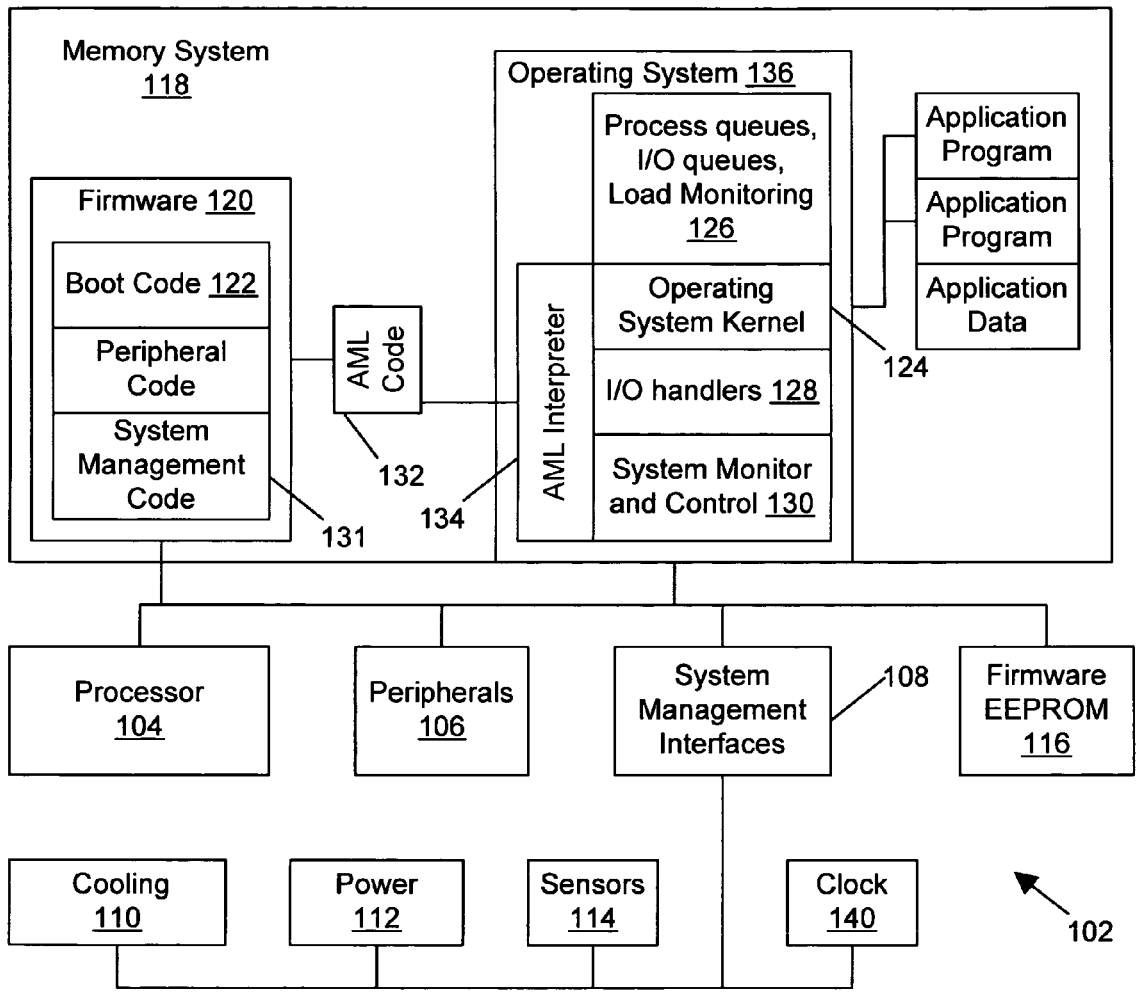
FIG. 1 is a block diagram of a digital device as known in the art embodying AML to control system management hardware.

FIG. 1 illustrates a digital device embodying AML. A digital device 102 includes a processor 104 connected to peripherals 106 and a system management interface 108. System management interface 108 controls cooling devices 110, power 112 supply control and system monitor sensors 114. The processor is also connected to a Firmware EEPROM 116 and a memory system 118 of one or more levels. Memory system 118 typically includes both Random Access Memory (RAM) and disk memory.

At system boot time, processor 104 copies firmware from firmware EEPROM 116 into a firmware portion 120 of RAM of memory system 118 for execution. Boot code 122 of firmware 120 then loads and starts the operating system kernel 124. Operating system kernel 124 initializes operating system Process queues, I/O queues, and Load Monitoring 126, starts I/O device handlers 128, and starts a system-level system monitor and control module 130.

Peripheral and system management code 131 in the firmware provides a set of AML Code 132 tasks to the operating system. In a typical system, this AML code is copied by peripheral and system management code 131 from images in firmware EEPROM 116. The AML code is executed by an AML interpreter 134 under control of the operating system 136. The AML Code tasks are invoked by the system monitor and control module 130 and provide interfaces from operating system kernel 124, I/O handlers 128, and system monitor and control 130 tasks to peripherals 106, and through system management interfaces 108 to cooling 110 devices, power 112 supply control, sensors 114, and other system management hardware as may be provided in the system.

Digital devices are evolving at a rapid pace. New system management hardware is released frequently, often providing functionality that was not anticipated when older versions of AML and ACPI were defined. It is therefore desirable to have a way of extending the set of predetermined control functions to include new and additional functions such that systems may be controlled in the best possible way.

For example, but not by way of limitation, future portable computer systems may have a power system incorporating a fuel cell in addition to, or in place of, a battery. Such a power system is likely to require power 112 supply control hardware functions different than those anticipated in an early version of the AML specification. New systems may have a programmable, multispeed, multiple-output, clock 140 having features not anticipated in early AML. Similarly, new, large, multiprocessor, servers may be partitioned into virtual machines; such a system may function best with additional control functions for controlling system partitioning.

A prior method of extending an intercompartment interface beyond the functions provided for a particular version of the AML specification is that of determining unused opcodes according to the specification, and defining these opcodes to be extended opcodes for the added functions. While this method works, the next AML specification may define new functions that map to these formerly undefined opcodes. Should this happen, the operating system and firmware compartments must be upgraded to support that next AML specification simultaneously or unexpected operation may occur because of the conflicting definitions of these opcodes.

The AML specification provides for an ADD_TABLE command. The ADD_TABLE command provides for dynamically extending an executable set of AML functions beyond the basic set of AML functions required to be present at system boot time.

Figure 2:
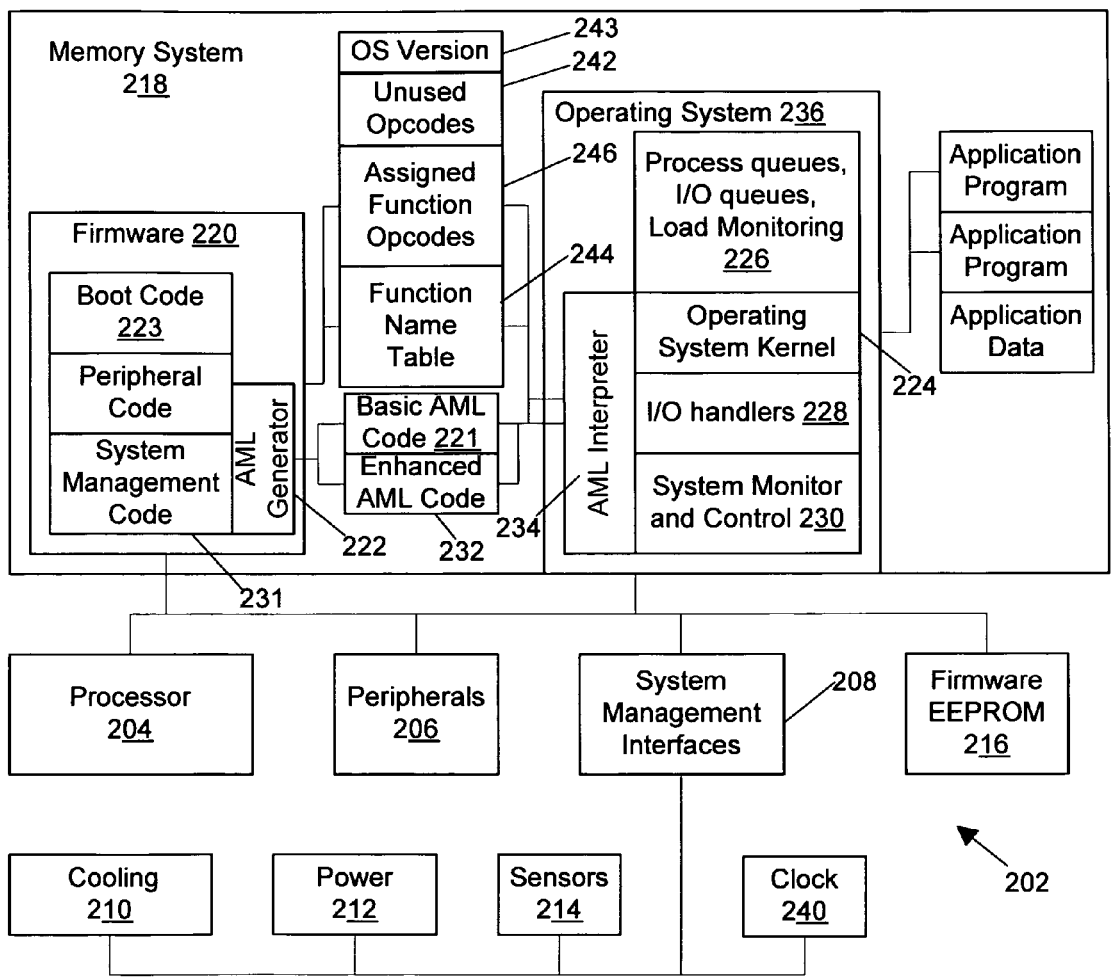
FIG. 2 is a block diagram of a digital device embodying an extendable AML to control system management hardware.

FIG. 2 illustrates an extendable AML for controlling new and enhanced functions for a digital device in manner compatible with future releases of ACPI and AML specifications.

A digital device 202 includes a processor 204 connected to peripherals 206 and a system management interface 208. System management interface 208 controls cooling devices 210, power supply 212 and system monitor sensors 214. The processor 204 is also connected to a Firmware EEPROM 216 and a memory system 218 of one or more levels. Memory system 218 typically includes both Random Access Memory (RAM) and disk memory.

Figure 3:
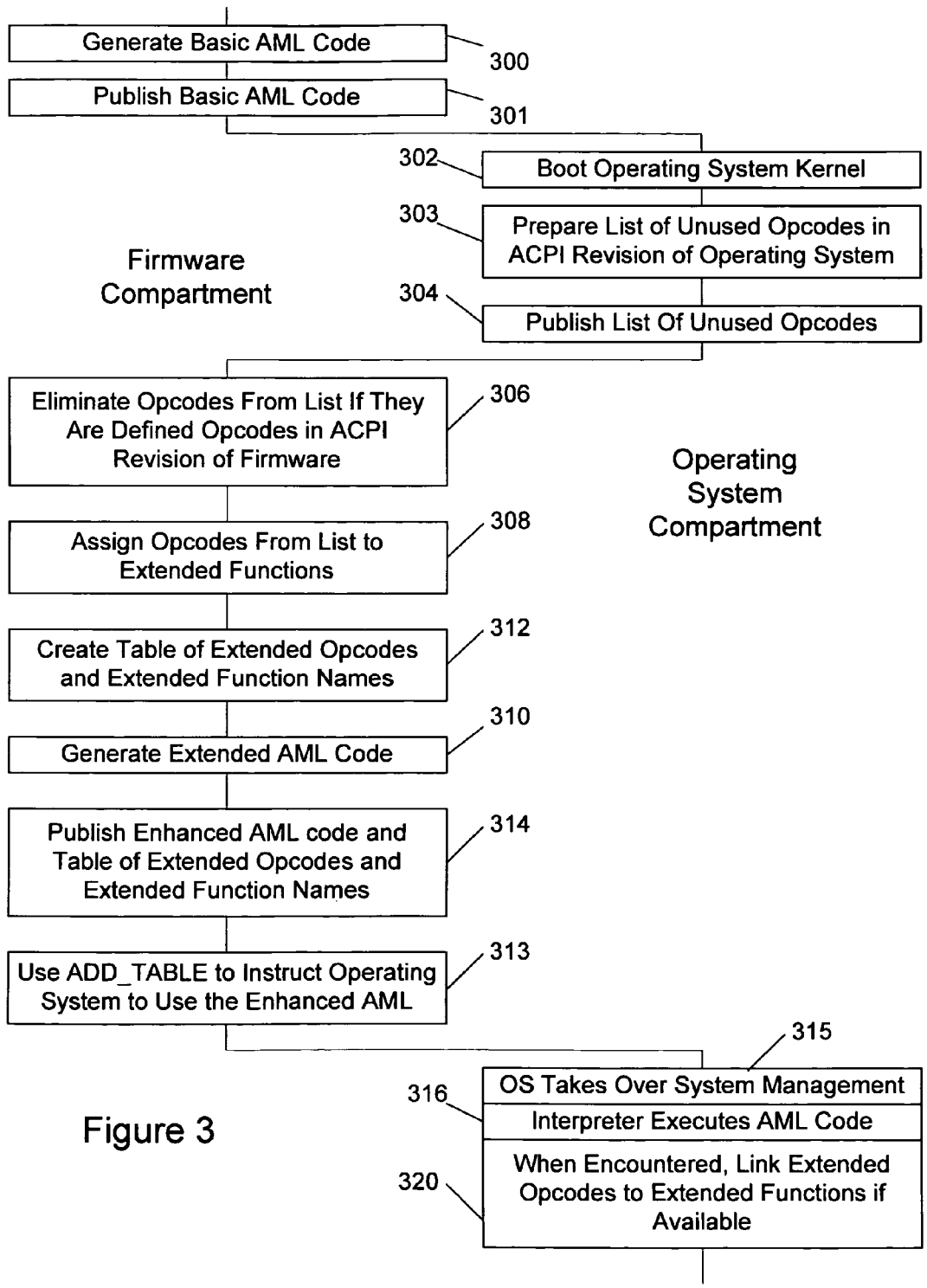
FIG. 3 is a partial flow chart of an embodiment of the method of implementing an extendable AML.

With reference to FIGS. 2 and 3, at system boot time, processor 204 copies firmware from firmware EEPROM 216 into a firmware portion 220 of RAM of memory system 218 for execution. Boot code 223 of firmware 220 then generates 300 a set of basic AML code 221 for common functions defined in the ACPI specification, publishes 301 the basic AML code 221 by placing it in an area accessible to the operating system, and loads and starts 302 the operating system kernel 224. The operating system kernel 224 then initializes the operating system's Process queues, I/O queues, Load Monitoring 226, and starts I/O device handlers 228, and a system-level system monitor and control module 230. Firmware 220 system management code 231 provides minimal system management functions, controlling cooling 210, power 212, sensors 214, and system clock 240 until system boot is complete and the operating system takes over 315 system management.

The AML interpreter 234 of the operating system compartment 236 prepares 303 a list of unused opcodes 242 available under the version of ACPI, and thus AML, specification supported by the operating system. The list of unused opcodes 242 is accompanied with revision identifiers specifying hardware specific drivers loaded into the operating system, and the version of ACPI, and thus the version of AML, supported. This list 242 is published 304 by storage in memory accessible to both the operating system 236 and the firmware 220. An AML code-generator 222 functionality of the firmware inspects this list 242, and eliminates 306 any opcodes that are defined in the version of ACPI, and thus the version of AML, specification it supports; such that the list 242 becomes a list of opcodes unused in both the firmware's 220 and operating system's 236 versions of AML.

Publication of the unused opcode list 242 is accompanied with a operating system (OS) version identifier 243 so that compatibility of extensions of the operating system 236 and firmware 220 can be verified. The OS version identifier 243 includes flags to indicate ACPI hardware-specific drivers installed in the operating system 236.

As the system continues to boot, enhanced AML code 232 is generated 310 dynamically by the AML code generator 222 component of firmware 220 from precursors within the firmware. The code generator 222 of the firmware compartment 220 also prepares a list of extended function names it uses in the AML code 232 in function name table 244, and assigns 308 these to opcodes selected from the unused opcode list 242. These assigned opcodes are therefore opcodes unused in the version of AML specification supported by the operating system that are also unused opcodes in the version of AML specification supported in the firmware. A table of assigned function opcodes 246 is created 312 with assigned function opcodes in locations corresponding to function names in function name table 244.

The generated enhanced AML code 232, function name table 244, and assigned function opcodes 246 are published 314 by placement in memory accessible to the AML interpreter 234 of the operating system 236. The operating system 236 is permitted to finish booting and begins execution of application programs. An ADD_TABLE call is used 313 to instruct the operating system 236 to use the enhanced AML code 232 in supporting system operation.

As system operation proceeds, the operating system 236 takes over 315 system management and its AML interpreter 234 executes 316 basic 221 and enhanced 232 AML code whenever system management tasks, including idle timer tasks, need to interface with system hardware.

The basic AML code 221 and enhanced AML code 232 are executed by an AML interpreter 234 under control of the operating system kernel 224, and may make use of system process and input/output (IO) queues 226. The AML code tasks are invoked by the system monitor and control module 230 and provide interfaces from operating system kernel 224, I/O handlers 228, and system monitor and control 230 tasks to peripherals 206, and through system management interface 208 to cooling 210 devices, power supply control 212, sensors 214, and other system management hardware as may be provided in the system.

When the AML interpreter sees an opcode it does not recognize, it checks to see if that opcode is in the assigned function opcodes 246 table. Unrecognized opcodes found in the assigned function opcodes 246 table are linked 320 with functions specified by the function name of the function name table 244 associated therewith, and the appropriate extended function is executed. These functions remain linked such that lookup of functions names in function name table 244 is not necessary when the opcodes are encountered again.

Figure 4:
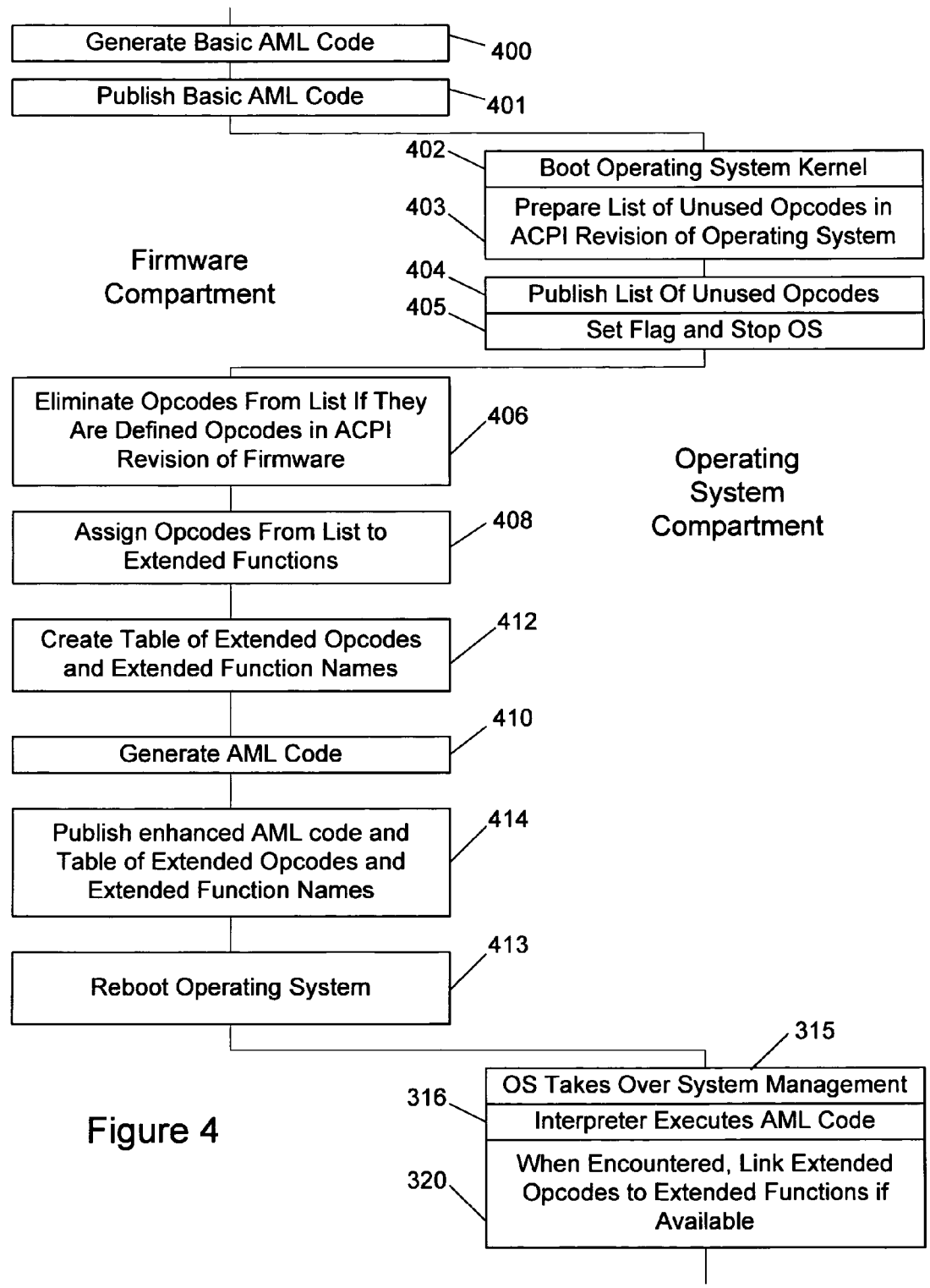
FIG. 4 is a partial flow chart of an alternative embodiment wherein a reboot is used instead of an ADD_TABLE command.

In an alternative embodiment, with reference to FIGS. 2 and 4, at system boot time, processor 204 executes boot code 223 and copies firmware from firmware EEPROM 216 into a firmware portion 220 of RAM of memory system 218 for execution. Boot code 223 of firmware 220 then generates 400 a set of basic AML 221 for common functions defined in the ACPI specification, publishes 401 the basic AML 221 by placing it in an area accessible to the operating system, then loads and starts 402 the operating system kernel 224. The operating system kernel 224 then initiales operating system Process queues, I/O queues, and Load Monitoring 226 functions, and starts I/O device handlers 228, and a system-level system monitor and control module 230. Firmware 220 system management code 231 provides minimal system management functions, controlling cooling devices 210, power control 212, sensors 214, and system clock 240 at this time.

The AML interpreter 234 of the operating system compartment 236 prepares 403 a list of unused opcodes 242 available under the version of ACPI, and thus AML, specification it supports. The list of unused opcodes is accompanied with revision identifiers specifying hardware specific drivers loaded into the operating system, and the version of ACPI supported. This list 242 is published 404 by storage in memory accessible to both the operating system 236 and the firmware 220. At this point a first-stage boot complete flag is set in memory, and the operating system 236 stops.

An AML code-generator 222 functionality of the firmware 220 inspects the list of unused opcodes 242, and eliminates 406 any opcodes of the list of unused opcodes that are defined in the version of AML specification it supports; such that the list 242 becomes a list of opcodes unused in both the firmware 220 and operating system's 236 versions of AML.

As the system continues to boot, enhanced AML code 232 is generated 410 dynamically by the AML code generator 222 component of firmware 220 from precursors within the firmware. The code generator 222 of the firmware compartment 222 also prepares a list of extended function names it uses in the AML code 232 in function name table 244, and assigns 408 these to opcodes selected from the unused opcode list 242. These assigned opcodes are therefore opcodes unused in the version of AML specification supported by the operating system that are also unused opcodes in the version of AML specification supported in the firmware. These assignments of opcode are recorded in a created 412 table of assigned function opcodes 246 in locations corresponding to function names in function name table 244.

The generated enhanced AML code 232, function name table 244, and assigned function opcodes 246 are published 414 by placement in memory accessible to the AML interpreter 234 of the operating system.

The operating system is re-booted 413, its kernel 224 is restarted, in the process it builds new process queues, I/O queues, and load monitoring structures 226, and is allowed to begin execution of application programs. The enhanced AML code 232 is used in supporting system operation.

As system operation proceeds, the operating system takes over 415 system management from the firmware, and the AML interpreter 234 executes routines in the basic AML code 221 and enhanced AML code 232 whenever system management tasks, including idle timer tasks, need to interface with system hardware.

As with the embodiment of FIG. 3, the basic AML code 221 and enhanced AML code 232 are executed by an AML interpreter 234 under control of the operating system 236 kernel 224, and may make use of system process and input/output (IO) queues 226. The AML code tasks are invoked by the system monitor and control module 230 and provide interfaces from operating system kernel 224, I/O handlers 228, and system monitor and control 230 tasks to peripherals 206, and through system management interface 208 to cooling 210 devices, power 212 supply control, sensors 214, and other system management hardware as may be provided in the system.

When the AML interpreter 234 sees an opcode it does not recognize, it checks to see if that opcode is in the assigned function opcodes 246 table. Unrecognized opcodes found in the assigned function opcodes 246 table are linked 420 with functions specified by the function name of the function name table 244 associated therewith, and the appropriate extended function is executed. These functions remain linked such that lookup of function names in function name table 244 is not necessary when the opcodes are encountered again.

A computer program product is any machine-readable media, such as an EEPROM 216 EPROM, ROM, RAM, DRAM, disk memory, or tape, having recorded on it computer readable code that, when read by and executed on a computer, instructs that computer to perform a particular method, function or sequence of functions. The computer readable code of a program product may be part or all of a program, such as an AML interpreter, an AML code generator, or firmware incorporating an AML code generator. A firmware EEPROM, or a computer containing a firmware EEPROM, containing computer readable code for generating an AML code using dynamically assigned opcodes for extended operations as herein described is a computer program product.

While the forgoing has been particularly shown and described with reference to particular embodiments thereof, it will be understood by those skilled in the art that various other changes in the form and details may be made without departing from the spirit hereof. It is to be understood that various changes may be made in adapting the description to different embodiments without departing from the broader concepts disclosed herein and comprehended by the claims that follow.

What is claimed is:

1. A method of providing extended functions in a digital device having code generator code of a first compartment for presenting a machine readable code conforming to an inter-compartment language specification to an interpreter of a second compartment, comprising steps: preparing a list of unused opcodes according to a version of the intercompartment language specification implemented in the second compartment; publishing the list of unused opcodes to code of the first compartment; assigning opcodes to the extended functions where the opcodes assigned are unused opcodes in a version of the intercompartment language specification supported by the interpreter in the second compartment and also unused opcodes in a version of the intercompartment language specification of the first compartment; publishing a table of assigned opcodes comprising names of the extended functions assigned to each assigned opcode; generating generated machine readable instructions according to the intercompartment language specification; wherein the generated machine readable instructions incorporate at least one of the assigned opcodes.

2. The method of claim 1, wherein the first compartment comprises a firmware compartment and the second compartment comprises an operating system compartment 3. The method of claim 2, wherein the intercompartment language specification is Advanced Configuration and Power Interface Machine Language (AML).

4. The method of claim 1 further comprising steps: linking extended opcodes from the table of assigned opcodes to extended functions associated with the associated function names; and executing the generated machine readable instructions.

5. The method of claim 4 further comprising the step of extending a basic set of machine readable instructions to include the generated machine readable instructions.

6. The method of claim 4 further comprising the steps of rebooting the first compartment to enable it to make use of the generated machine readable instructions.

7. A memory system comprising machine readable media having recorded therein machine readable generator code of a first compartment for presenting a machine readable code conforming to an intercompartment language specification to machine readable code of a second compartment,
wherein the generator code receives a list of unused opcodes according to a version of the intercompartment language specification implemented in the second compartment;
the generator code assigns opcodes to extended functions where the assigned opcodes are unused opcodes in the version of the intercompartment language specification in the second compartment and unused opcodes in a version of the intercompartment language specification implemented in the first compartment;
the generator code publishes a table of assigned opcodes with associated function names, and generating generated machine readable instructions using the assigned opcodes according to the intercompartment language specification.

8. The memory system of claim 7, wherein the first compartment comprises a firmware compartment.

9. The memory system of claim 8, wherein the intercompartment language specification comprises Advanced Configuration and Power Interface Machine Language (AML).

10. A computer program product comprising machine readable media having recorded therein machine readable code for a method of providing extended functions in a digital device having machine readable code of a first compartment for presenting a machine readable code conforming to an intercompartment language specification to machine readable code of a second compartment, the machine readable code comprising code for executing steps: preparing a list of unused opcodes according to a version of the intercompartment language specification implemented in the second compartment; publishing the list of unused opcodes to code of the first compartment; assigning opcodes to extended functions where the opcodes assigned are unused opcodes in the version of the intercompartment language specification in the second compartment and unused opcodes in a version of the intercompartment language specification implemented in the first compartment; publishing a table of assigned opcodes and function names; generating generated machine readable instructions according to the intercompartment language specification; wherein the generated machine readable instructions make use of the assigned opcodes.

11. The computer program product of claim 10, wherein the first compartment comprises a firmware compartment.

12. The computer program product of claim 11, wherein the intercompartment language specification comprises Advanced Configuration and Power Interface Machine Language (AML).

13. A memory system comprising machine readable media having recorded therein machine readable generator code of a first compartment for presenting a machine readable code conforming to an intercompartment language specification to machine readable code of a second compartment, wherein the generator code comprises means for: receiving a list of unused opcodes from the machine readable code of the second compartment, the list of unused opcodes comprising opcodes unused according to a version of the intercompartment language specification implemented in the second compartment; assigning opcodes to extended functions where the assigned opcodes are unused opcodes in both the version of the intercompartment language specification implemented in the second compartment and in a version of the intercompartment language specification implemented in the first compartment; publishing a table of assigned opcodes to the code of the second compartment; generating generated machine readable instructions using the assigned opcodes.

* * * * *